J. BROTHERS.
WHEEL.
APPLICATION FILED JULY 27, 1914.
1,135,432.
Patented Apr. 13, 1915.
2 SHEETS—SHEET 1.
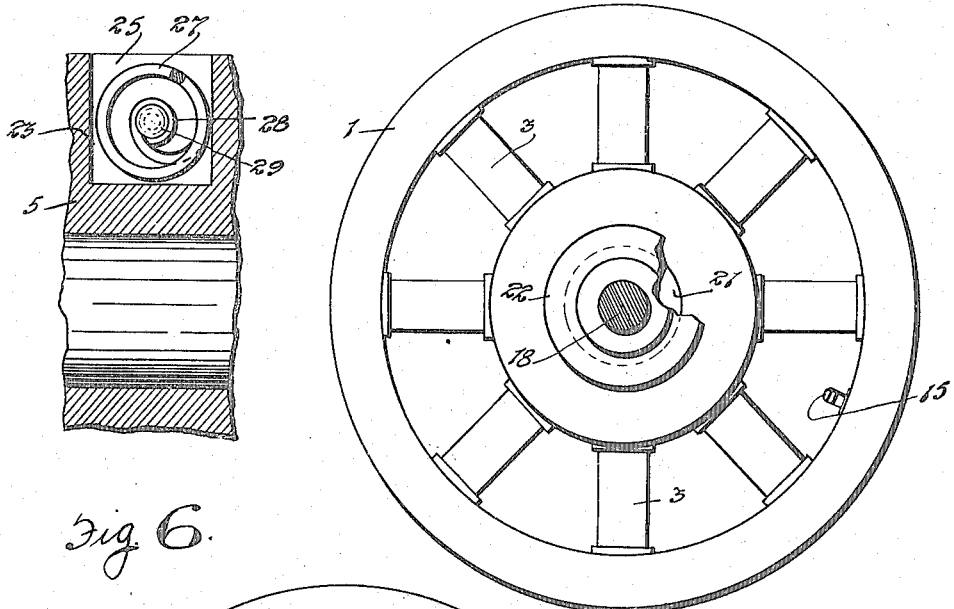
Fig. 6.
Fig. 1.
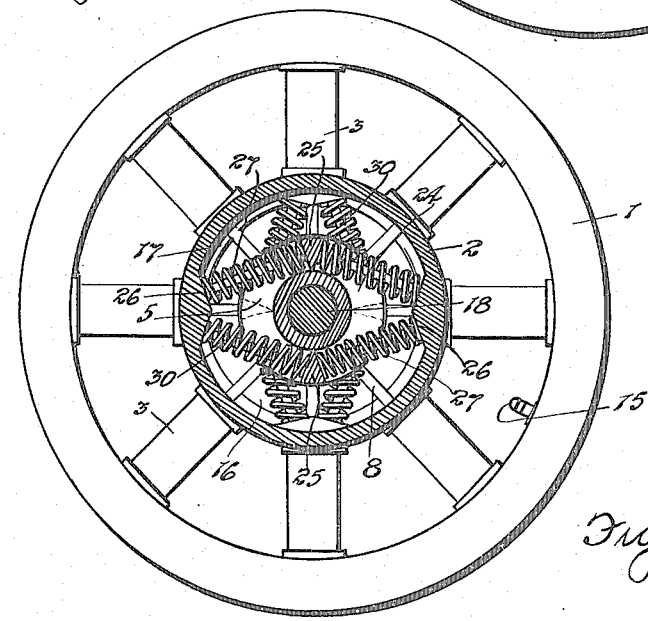
Fig. 4.
WITNESSES
Roland Foster
INVENTOR
J Brothers
By
Attorney.

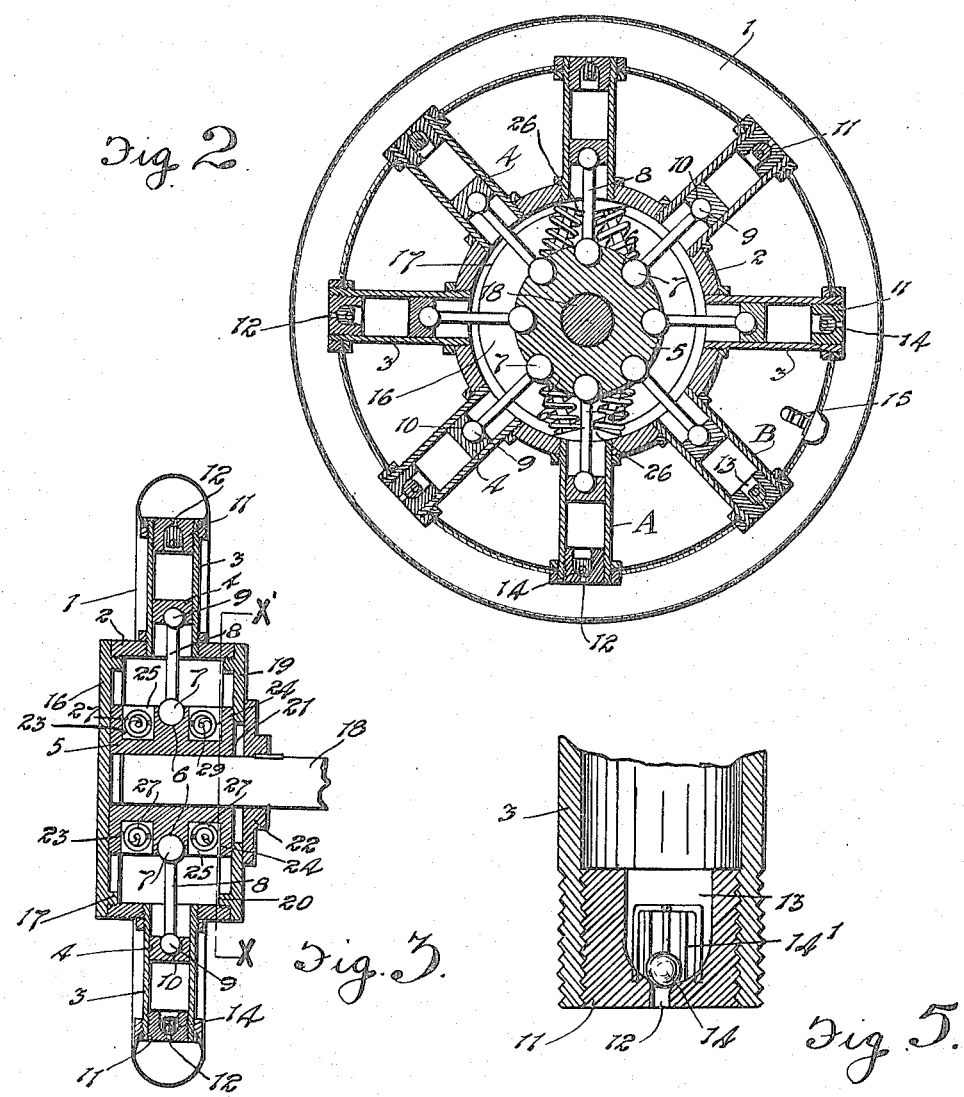

UNITED STATES PATENT OFFICE.

JOHN BROTHERS, OF GRANDVIEW, MANITOBA, CANADA.

WHEEL.

1,135,432.   Specification of Letters Patent.   Patented Apr. 13, 1915.

Application filed July 27, 1914. Serial No. 853,566.

*To all whom it may concern:*

Be it known that I, JOHN BROTHERS, of the village of Grandview, in the Province of Manitoba, Canada, have invented certain new and useful Improvements in Wheels, of which the following is the specification.

The invention relates to improvements in wheels and the object of the invention is to provide a non-puncturable wheel having all the cushioning values of the ordinary pneumatic or rubber tired wheel.

A further object of the invention is to provide a mechanically constructed metallic wheel which can be manufactured at reasonable expense and has the parts designed so that they can be quickly assembled or dismounted.

With the above objects in view the invention consists essentially in a wheel presenting an inner hub, an outer hub, a hollow rim, spokes in the nature of cylinders extending between the outer hub and the rim, pistons slidably mounted in the spokes, piston rods connecting the pistons with the inner hub, valves located at the juncture of the spokes with the rim, closure plates carried by the outer hub and inclosing the inner hub and spiral springs inserted between the inner hub and the outer hub, the parts being arranged and constructed as hereinafter more particularly described and later pointed out in the appended claim.

Figure 1 represents a side view of the complete wheel, part being broken away to expose construction. Fig. 2 represents a vertical sectional view centrally through the wheel. Fig. 3 represents a vertical sectional view through the wheel, the section being taken in a plane at right angles to that shown in Fig. 2. Fig. 4 represents a vertical sectional view through the hubs, the section being taken in the plane denoted by the line X—X′ Fig. 3. Fig. 5 represents an enlarged detailed sectional view through the valve and adjoining parts. Fig. 6 represents an enlarged detailed end view of one of the springs with a fragment of the hub in section, showing the manner in which the spring is seated and fastened.

In the drawings like characters of reference indicate corresponding parts in each figure.

1 represents a hollow rim in the nature of a metallic tube. In actual practice this rim can be supplied with a tread member such as an applied rubber or leather strip which will prevent the wheel from being unduly noisy when in use.

2 represents a short cylindrical outer hub contained within the rim and connected to it by permanent hollow spokes 3 in the nature of cylinders, the ends of the cylinders being suitably threaded into the hub and rim and fastened by applied lock or jam nuts. These spokes radiate in the usual way between the hub and rim and receive sliding pistons 4.

5 is an inner hub contained in the outer hub and fitted with sockets 6 which receive the inner ball ends 7 of piston rods 8 having their outer ends formed into balls 9 set in sockets 10 provided in the inner faces of the pistons. Accordingly the connections between the rods and the pistons and inner hub are by means of what is commonly called ball and socket joints.

11 are plugs screw threaded into the outer ends of the spokes or cylinders and supplied with ducts 12 which open to valve chambers 13 containing ball valves 14. The ducts connect the piston chambers normally with the interior of the rim. The balls are held within a cage 14′ secured to the plug, in each instance.

15 is a valve of the ordinary form secured to the rim and by means of which air can be introduced into the rim.

16 is an outer face plate in the nature of a disk carrying a screw threaded flange 17 designed to screw into the outer end of the outer hub.

18 represents the wheel spindle which is received rotatably within the inner hub.

19 represents a face plate in the nature of a disk supplied with a screw threaded flange 20 which screw threads into the inner end of the outer hub. This disk is formed with an open center 21 which receives the spindle and allows the spindle to have a movement with the inner hub in respect to the outer hub.

22 is a closure plate fastened to the spindle and closing over the opening 21.

The inner hub is formed with circumferentially directed channels 23 and 24 crossed by suitably disposed more or less V-shaped webs 25.

The inner face of the outer rim is constructed to present inclined abutments 26. Spiral springs 27 are inserted between the hubs, the inner ends of the springs bearing on the ribs while the outer ends engage with the abutments. The extremities of the springs are formed into eyes 28 so that they can be fastened by pins 29 permanently to the ribs and to the abutments.

30 are rods contained within the springs and having their outer ends permanently anchored in the abutments and their inner ends stopping short of the webs. These springs are provided to counteract any under winding action of the outer hub and parts carried thereby around the inner hub. It will be seen that if the outer hub attempted to turn in respect to the inner hub the springs would retard the movement and further if the turning movement became unduly strong it would be counter-acted by the inner ends of the rods striking the ribs. The face plates 16 and 19 prevent the inner hub from shifting endwise in respect to the outer hub and form also end bearings on which the inner hub can slide in any direction depending on the stress brought on the wheel.

When the wheel is to be used, air is pumped into the hollow rim by a pump applied to the nipple of the valve 15. The air will be pumped in until the pressure is considerable within the rim. As the air under pressure enters the rim it will force the valves open and permit the air to enter the outer ends of the cylinders. The pistons will be moved under the air pressure until the inner hub is actually centered within the outer hub as will be readily understood. When the wheel is used the weight of the vehicle is actually suspended by an air cushion between the inner hub and the rim. In the rotation of the wheel any jar is taken up in the air cushion. To better understand the action of the air, reference is made to Fig. 2 to the particular spokes A and B. In the position shown in this figure and considering the weight of the vehicle which the wheel is supporting applied, the piston of the cylinder A will move down and the adjoining valve will immediately close. The instant the valve closes the pressure in the cylinder A increases under further movement of the piston. The air in the adjoining cylinders will also be slightly compressed in a similar manner by the movement of the pistons. On the upper side of the wheel however a different action takes place. The valves remain open and as the plungers move in the pressure is equalized in the piston chambers through the valves which are open. As the weight of the vehicle is transferred, in the rotation of the wheel, from the spoke A to that B the plunger of the spoke B moves out, the adjoining valve closes and pressure is built up in the piston chamber in the same manner as just described. This action continues in the successive spokes as the wheel rotates. Consequently the weight of the vehicle is suspended at all times by an air cushion.

I might remark that the air could be dispensed with as a cushioning means and springs inserted without departing from the spirit of the invention, in which instance the valves and plungers would be removed and a spiral spring placed in the cylinder between the outer face of the respective pistons and the rim. I do not however consider this as good nor as serviceable construction as the one hereinbefore described where the air cushion is used.

What I claim as my invention is;—

A wheel comprising a metallic tubular rim, an outer open centered hub contained within the rim, radiating spokes in the nature of cylinders connecting the outer hub permanently to the rim, the interior of the cylinders opening to the interior of the rim, an inner spindle receiving hub contained within the open center of the outer hub, facing plates secured to the ends of the outer hub and bearing against the ends of the inner hub, pistons slidably contained within the cylinders, connecting rods having their inner and outer ends fastened by means of ball and socket joints to the pistons and the inner hub, controlling valves located at the juncture of the cylinder like spokes with the rim, means for admitting air under pressure to the rim and spring means interposed between the inner and outer hubs, said spring means being arranged to counteract the turning movement of the outer hub, in respect to the inner hub, as and for the purpose specified.

Signed at Grandview this 22nd day of June 1914.

JOHN BROTHERS.

In the presence of—
W. M. VANCE,
ROY F. STEELE.

Copies of this patent may be obtained for five cents each, by addressing the "Commissioner of Patents, Washington, D. C."